M. J. DENDINGER.
HAY STACKER.
APPLICATION FILED MAR. 30, 1917.

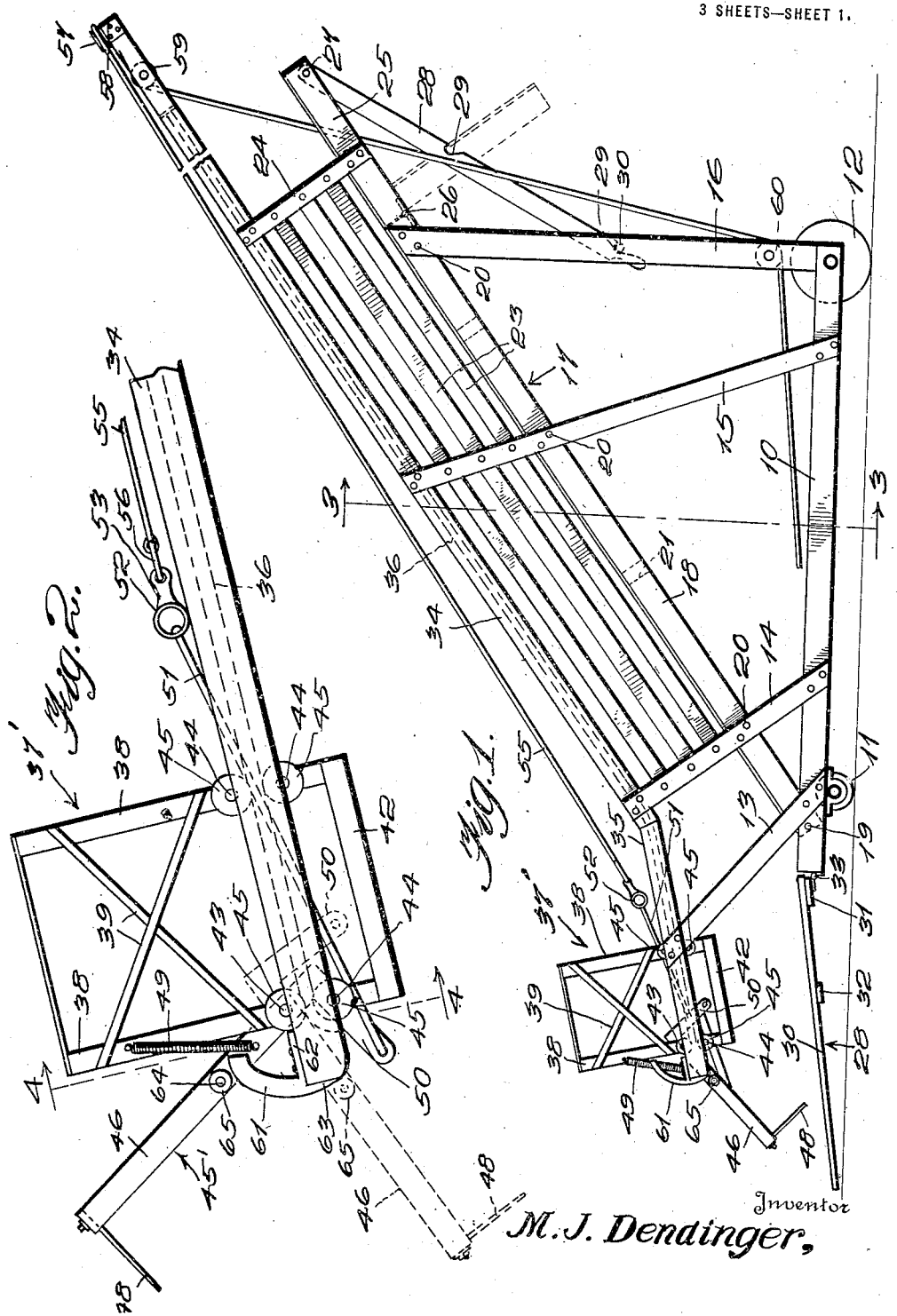

1,251,759.

Patented Jan. 1, 1918.
3 SHEETS—SHEET 2.

Inventor
M. J. Dendinger,
By C. L. Parker
Attorney

M. J. DENDINGER.
HAY STACKER.
APPLICATION FILED MAR. 30, 1917.

1,251,759.

Patented Jan. 1, 1918.
3 SHEETS—SHEET 3.

Fig. 5.

Inventor
M. J. Dendinger,

By C. L. Parker.
Attorney

UNITED STATES PATENT OFFICE.

MICHAEL J. DENDINGER, OF RAPID CITY, SOUTH DAKOTA.

HAY-STACKER.

1,251,759. Specification of Letters Patent. Patented Jan. 1, 1918.

Application filed March 30, 1917. Serial No. 158,576.

*To all whom it may concern:*

Be it known that I, MICHAEL J. DENDINGER, a citizen of the United States, residing at Rapid City, in the county of Pennington and State of South Dakota, have invented certain new and useful Improvements in Hay-Stackers, of which the following is a specification.

My invention relates to improvements in elevators or stackers for hay or the like, of the general type that embody an inclined trough or chute, with a member, such as a rake, to engage the hay and effect its travel up the inclined trough or chute.

An important object of the invention is to provide means for locking the carriage which travels longitudinally of the inclined chute, in the lowermost position, until the movable rake connected therewith has been brought into proper engagement with the hay or the like.

A further object of my invention is to provide apparatus of the above mentioned character, which is simple in construction, inexpensive to manufacture, strong and durable.

Other objects and advantages of the invention will be apparent during the course of the following description.

Figure 3:
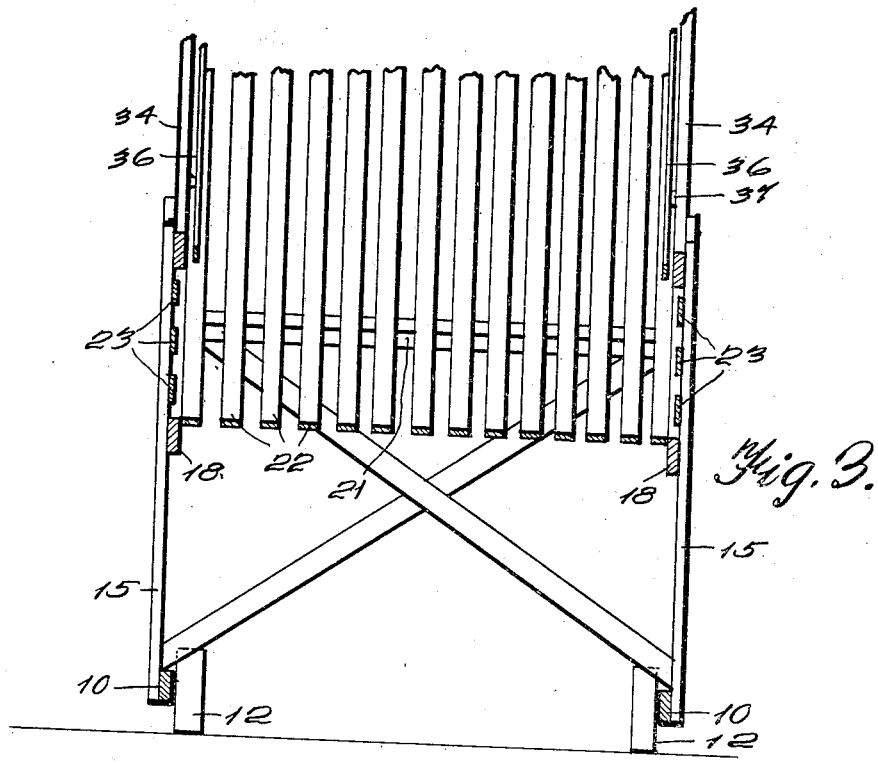
Figure 4:
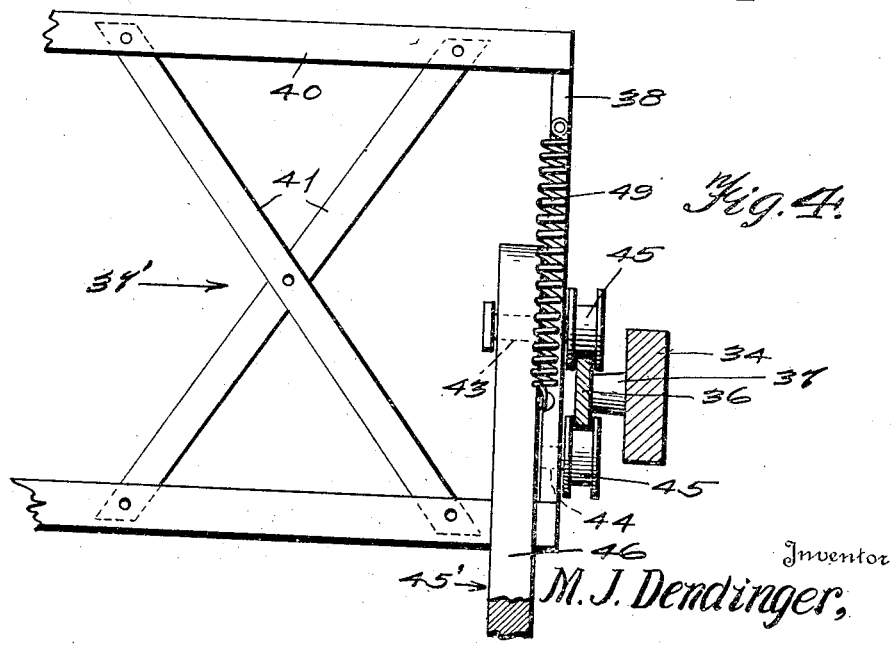

In the accompanying drawings forming a part of this specification and in which like numerals are employed to designate like parts throughout the same, Figure 1 is a side elevation of apparatus embodying my invention, Fig. 2 is an enlarged side elevation of the vertically movable rake and associated elements, Fig. 3 is a transverse sectional view taken on line 3—3 of Fig. 1, Fig. 4 is an enlarged detail vertical section taken on line 4—4 of Fig. 2, and, Fig. 5 is a plan view of the apparatus.

In the drawings, wherein for the purpose of illustration is shown a preferred embodiment of my invention, a wheeled supporting frame is shown, comprising lower horizontal longitudinal beams 10, to the opposite ends of which are pivotally connected wheels 11 and 12. Rigidly connected with the longitudinal beams 10 near their ends are upwardly projecting inclined standards 13, 14, 15 and 16.

The apparatus further comprises an inclined trough or chute, designated as a whole by the numeral 17. This inclined chute comprises lower inclined rails 18, rigidly connected at their lower ends with the beams 10, as shown at 19, and rigidly connected with the standard 14, 15 and 16, as shown at 20. The rails 18 are connected by transverse beams or bars 21, upon which are secured longitudinal slats 22, as clearly shown in Fig. 3. These slats constitute the bottom of the inclined chute and extend to the lower end thereof. The sides of the inclined chute are formed of longitudinal slats 23, secured at their lower ends to the standard 14 and at their upper ends to a bar 24. These slats may also be secured to the standard 15.

The upper end of the bottom of the chute 17 is preferably shortened and is provided with a swinging bottom-extension 25, hinged thereto, as shown at 26. This bottom-extension has pivotal connection at its forward end, as shown at 27, with bars 28, provided with recesses or notches 29, to receive therein stops or lugs 30, rigidly secured to the standards 16. It is thus apparent that the extension 25 may be locked in the upper position thereby forming an extension for the bottom of the inclined chute or may assume an inclined position, as indicated by the dotted lines.

Arranged at the rear ends of the beams 10 and near the lower or take-up end of the inclined chute 17 is a supporting rack 28, comprising spaced longitudinal tines 30, rigidly secured to transverse bars 31 and 32. The transverse bar 31 is pivotally connected with the rear ends of the beams 10 by hinges 33. It is thus apparent that the hay delivered upon the supporting rack 28 may be moved forwardly thereon and be discharged into the inclined chute 17.

The numeral 34 (see more particularly Figs. 1, 2 and 4) designates upper inclined side rails, which are rigidly secured to the upper ends of the standards 14 and 15 and to the bar 24. The rails 34 project, at their upper ends, beyond the inclined chute, for a substantial distance. At their lower ends, the rails 34 have connection with rail extensions 35, extending substantially parallel with the supporting rack 30. The rail extensions 35 are rigidly connected with the upper ends of the standards 13.

Arranged inwardly of and extending longitudinally of the rails 34 and their lower extensions 35, are track rails 36, provided upon their outer sides with attaching members 37 (see Fig. 5), which are rigidly secured to the rails 34 and their extensions. These track rails 36 conform to the shape or inclination of the rails 34 and their extensions 35, as shown.

Adapted to travel longitudinally of the track rails 36 and arranged therebetween is a carriage 37', preferably formed of an open-work construction, embodying upstanding corner posts 38, rigidly connected by diagonal braces 39. The corner posts 38 of the carriage, at one end, are rigidly connected with the corner posts at the other end, by longitudinal beams 40, which are in turn rigidly connected by diagonal braces 41. The lower ends of the posts 38 are connected by transverse beams 42, and the bottom of the frame 37 is formed open, thus in no way interfering with the accumulation of hay upon the supporting rack.

As more clearly shown in Figs. 2 and 4, the corner posts 38 carry upper and lower studs 43 and 44, upon which are rotatably mounted grooved wheels 45, operating above and below the track rails 36, as clearly illustrated in Fig. 4. It is thus apparent that the carriage 37 is adapted to travel longitudinally of and upon the track rails 36.

The numeral 45' designates a preferably vertically swinging hay engaging member, preferably in the form of a rake. This rake comprises end levers or bars 46, having openings arranged near and spaced from their forward ends, for receiving the studs 43, whereby the levers 46 are pivotally connected with the carriage 37, to swing in a substantially vertical plane. The rear ends of the levers 46 are connected by a transverse bar 47, to which are secured downwardly extending tines 48. The levers 46 are swung upwardly by means of retractile springs 49, secured thereto and to the carriage 37. The levers 36 are provided at their forward ends with downwardly extending cranks 50, having connection with elements 51, which may be cables, rods or the like, having their forward ends connected with a transverse tubular equalizing device 52. This equalizing device is provided near its center with an attaching bracket 53, having connection with a diagonal brace 54, also connected with the ends of the tubular equalizer 52. A cable 55 or the like is detachably connected with the bracket 53, by means of a hook 56 or the like. The cable 55 is passed about a pulley 57, secured to a transverse bar 58, in turn secured to the ends of the rails 34. The cable also engages a vertically arranged pulley 59, secured to the transverse bar 58. The cable 53 then extends downwardly and passes about a pulley 60, carried by the standard 16. The cable is pulled by means of horses or the like.

Means are provided to lock the carriage 37' in the lowermost position, until the rake 45 has moved downwardly in proper engagement with the hay, comprising longitudinally curved lock-tracks 61 (see Figs. 1, 2 and 4.) The lock-tracks 61 are provided with extensions 62 and 63, and the extensions 62 are bolted or otherwise rigidly secured upon the lower or rear end of the rails 18. The lock-tracks 61 project inwardly beyond the rails 34 for a substantial distance, as clearly shown in Fig. 5. Pivotally connected with the levers 46 at 64, are wheels 65, adapted to travel upon the outer curved surfaces of the lock-tracks 61, when the rake is swung downwardly. It is thus apparent that when the cable 55 is pulled, for elevating the carriage 38, the wheels 65 contact with the lock-tracks 61, thus temporarily preventing forward travel of the carriage 38 until the wheels 65 have cleared the lower ends of the extensions 63 of the lock-tracks. When this has been done, the springs 49 tend to move the rake upwardly and the wheels 65 are located forwardly of the extensions 62. Further pull upon the cable 55 will now elevate the carriage and the wheels 65 will also travel upon and engage with the upper surfaces of the track-rails 36, the rake being held in the lower position by the cable. Attention is called to the fact that extensions 62 are arranged to engage the upper rear wheels 45, thus serving as stop means to define the travel of the carriage in a downwardly direction.

The operation of the apparatus is as follows:

With the rake 45 in the upper position, as shown in Fig. 2, the hay is fed upon the supporting rack 28 by any suitable means. When a sufficient amount of this hay has accumulated upon the supporting rack, the cable 55 is pulled. This action of the cable (the carriage 37' being primarily located in the lower position); first swings the rake 45 to the lower position, as shown in Fig. 1. The wheels 65 clear the extensions 63 and are arranged beneath the extensions 62. The carriage 38 is now released from locked engagement with the lock-rails 61 and further pull upon the cable advances the cable upwardly along the track. The rake 45 now serves to carry the hay longitudinally and upwardly of the chute. When the hay is discharged from the upper end of the chute, the cable 55 may be disengaged by unhooking the cable from the evener behind the team pulling on the cable, and the carriage allowed to gravitate to the lowermost position. The movement of the carriage is arrested by the extensions 62 of the lock rails. As soon as the cable 55 is disconnected from the equalizing device 52, the springs 49 return the levers 46 to the uppermost position, and when the carriage 37' approaches the lock-rails 61, the wheels 65, pass over the upper ends of these lock-rails, the parts again assuming the position shown in Fig. 2.

The function of the bottom extension 25 is to provide means whereby the hay may be elevated for a greater height, as the height of the stack increases.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In apparatus of the character described, the combination with an inclined chute, of a carriage to travel longitudinally of the chute, a movable hay engaging member connected with the carriage, and means to lock the carriage against upward movement until the hay engaging member has been moved to the lower active position.

2. In apparatus of the character described, the combination with an inclined chute, of a carriage to travel longitudinally thereof, a movable hay engaging member connected with the carriage and having extensions, relatively stationary members arranged to be engaged by the extensions and disengaged thereby when the hay engaging member has been moved downwardly for a predetermined distance, and means to move the hay engaging member downwardly and to move the carriage longitudinally of the chute.

3. In apparatus of the character described, the combination with an inclined support for straw or the like, of a carriage mounted to travel longitudinally of the support, a hay engaging member pivoted to the carriage to swing in a substantially vertical plane, means to move the hay engaging member upwardly, contact devices carried by the hay engaging member, relatively stationary devices disposed in the path of travel of the contact devices to engage and disengage the contact devices whereby the carriage may be temporarily locked in the lowermost position, and means to move the hay engaging member downwardly and the carriage longitudinally of the support.

4. In apparatus of the character described, the combination with a supporting frame, of an inclined chute connected therewith, a track extending longitudinally of the chute, a carriage to travel upon the track, a vertically swinging rake pivoted to the carriage, means to automatically swing the rake upwardly, longitudinally curved lock tracks connected with the supporting frame near the rear end thereof, contact elements carried by the rake and adapted to engage the lock tracks, and means to swing the rake downwardly and move the carriage up the inclined track.

5. In apparatus of the character described, the combination with a supporting frame, of an inclined chute connected therewith, an inclined track extending longitudinally of the chute, a carriage to travel upon the track, a vertically swinging rake pivoted to the carriage, rollers carried by the rake, longitudinally curved lock tracks secured to the rear end of the supporting frame to contact with the rollers, a spring to move the rake upwardly, and means to move the rake downwardly and to effect the longitudinal travel of the carriage.

6. In apparatus of the character described, the combination with an inclined chute, of a carriage to travel longitudinally thereof, a vertically movable rake connected with the carriage, means to lock the carriage against upward movement before the vertically movable rake has moved downwardly for a predetermined distance and to release the carriage after the rake has moved downwardly for the predetermined distance, automatic means to move the rake upwardly, and means having detachable connection with the rake to move it downwardly.

In testimony whereof I affix my signature in presence of two witnesses.

MICHAEL J. DENDINGER.

Witnesses:
ETHAN ALLEN,
C. E. VAN VLACK.

Copies of this patent may be obtained for five cents each, by addressing the "Commissioner of Patents, Washington, D. C."